(12) United States Patent
Trago et al.

(10) Patent No.: US 6,455,960 B1
(45) Date of Patent: Sep. 24, 2002

(54) DIRECT DRIVE ROLLER MOTOR

(75) Inventors: Bradley A. Trago, Rockford, IL (US); Richard Nelson, Joplin, MO (US); William T. Fejes, Jr., Boxford, MA (US)

(73) Assignee: Pacific Scientific Company, Rockford, IL (US)

(*) Notice: Subject to any disclaimer, the term of this patent is extended or adjusted under 35 U.S.C. 154(b) by 0 days.

(21) Appl. No.: 09/620,029

(22) Filed: Jul. 20, 2000

(51) Int. Cl.⁷ .............................. H02K 7/00; H02K 9/00
(52) U.S. Cl. .......................... 310/64; 310/67 R; 482/54
(58) Field of Search .............................. 310/64, 52, 54, 310/47, 50, 254, 258, 259, 67 R; 482/51, 54; 198/952

(56) References Cited

U.S. PATENT DOCUMENTS

| | | | | |
|---|---|---|---|---|
| 3,701,911 A | * | 10/1972 | Hallerback | 310/60 |
| 4,032,807 A | * | 6/1977 | Richter | 310/178 |
| 4,121,127 A | * | 10/1978 | Adelski et al. | 310/67 R |
| 4,574,210 A | * | 3/1986 | Wieland | 310/59 |
| 4,602,779 A | | 7/1986 | Ogden | 272/69 |
| 4,635,927 A | | 1/1987 | Shu | 272/96 |
| 4,643,418 A | | 2/1987 | Bart | 272/69 |
| 4,664,646 A | | 5/1987 | Rorabaugh | 474/88 |
| 5,141,479 A | | 8/1992 | Vanjani et al. | 482/54 |
| 5,469,608 A | * | 11/1995 | Biancalani | 26/19 |
| 5,476,430 A | | 12/1995 | Lee et al. | 482/54 |
| 5,488,837 A | * | 2/1996 | Sekino et al. | 62/244 |
| 5,674,453 A | | 10/1997 | Watterson et al. | 482/54 |
| 5,857,916 A | * | 1/1999 | Schoch et al. | 464/183 |
| 6,302,826 B1 | * | 10/2001 | Lee | 482/54 |

* cited by examiner

Primary Examiner—Nestor Ramirez
Assistant Examiner—Dang Dinh Le
(74) Attorney, Agent, or Firm—Greer, Burns & Crain, Ltd.

(57) ABSTRACT

A direct drive roller motor for use in a belt drive system includes a brushless DC motor that has an external rotor that functions as a direct drive roller. The motor has stator coils mounted on a stator shaft that is physically and thermally coupled at both ends thereof to a support structure which provides in addition to support, a function of dissipating thermal energy generated by the $i^2R$ losses of the stator coils and the magnetic core losses of the stator.

11 Claims, 7 Drawing Sheets

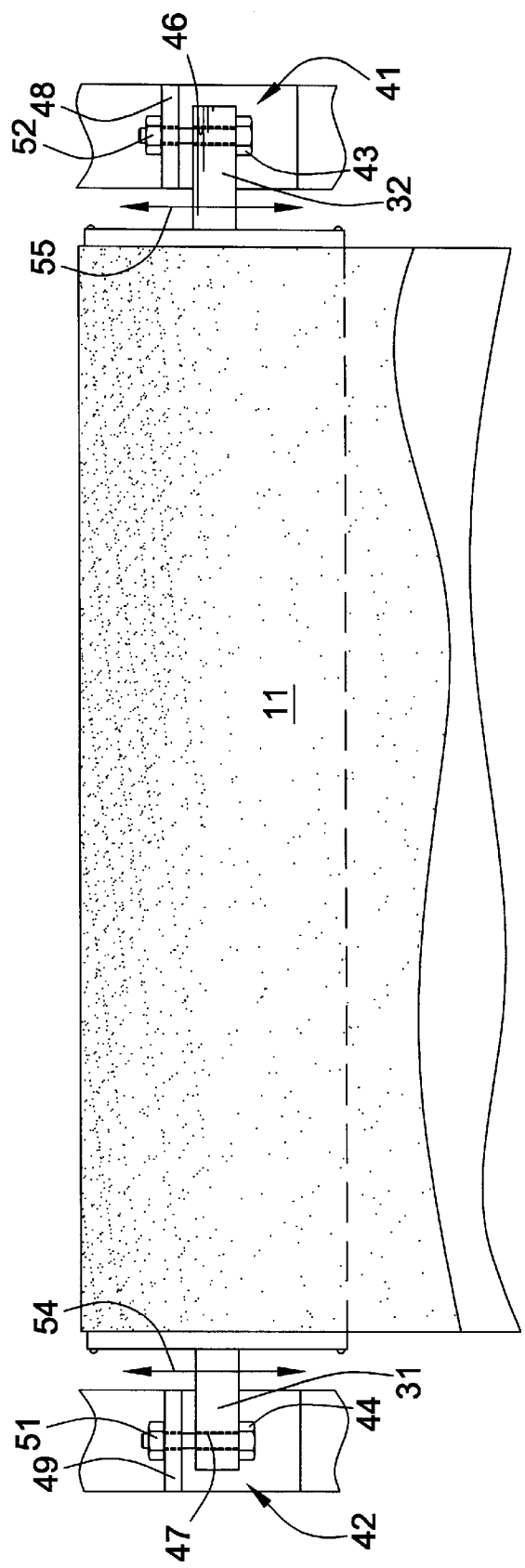

DIRECT DRIVE ROLLER MOTOR

FIELD OF THE INVENTION

This invention relates to roller belt drive motors and more particularly relates to an integrated roller belt drive motor for use in a treadmill.

BACKGROUND OF THE INVENTION

Exercise treadmills are amongst the most popular physical fitness apparatus found in homes and commercial gyms. Many treadmills have walkbelts powered by DC or AC motors. Whether DC or AC motors are employed to drive the walkbelts, most include drive belt drive systems that utilize pulleys and belts to couple the motor to an elongated drive roller wheel that cooperates with an underside of the walkbelt to drive the same. The walkbelt normally includes a second elongated roller that also cooperates with the walkbelt underside and simply provides an idling function to return the belt to the drive roller.

With increased popularity of treadmills in the home has come heightened awareness that the bulky nature of the treadmill does not make it an attractive addition to the living room or bedroom for that matter. Treadmills commonly include bulky housing structures at the drive roller end to accommodate the drive motor, pulley wheel and belt systems, as well as, a flywheel which form a part of the treadmill drive system. This bulky housing problem has been addressed in the Rorabaugh U.S. Pat. No. 4,664,646 where Rorabaugh teaches the idea of utilizing an elongated electric motor and a flywheel axially associated with the motor to establish an overall silhouette that fits within a flat frame arrangement. The frame is hinged at one end and secured to a support surface in a manner that allows the frame arrangement which carries the treadmill walkbelt to be lifted and stored vertically. The use of a flywheel in a treadmill walkbelt drive system as shown by Rorabaugh is desirable because the flywheel adds rotational inertia to the drive system. The rotational inertia resists momentary increases in drag, such as when a person first steps upon the treadmill. The inertia, in practical terms, reduces the demand for torque production during such momentary resistive surges upon the motor.

The subject invention uniquely distinguishes over the Rorabaugh patent and other known prior art treadmills and treadmill motor drives in that the need for a separate drive motor and flywheel are completely removed by the inclusion of a drive motor integrated into a walkbelt drive roller. The subject invention also provides the unparalleled advantage of allowing for the inclusion of a flywheel within the belt drive roller of a treadmill.

SUMMARY OF THE INVENTION

The invention is directed to a direct drive roller motor for use in a belt drive system that engages both the direct drive roller motor and another roller, both of which rollers are mounted for rotation on a support structure. In the broadest sense the roller motor is a brushless DC motor that has an external rotor that functions as a direct drive roller. The motor has stator coils mounted on a stationary stator shaft that is physically and thermally coupled at both ends thereof to the support structure which provides in addition to support, a heat dissipating function. The stator shaft is comprised of an aluminum alloy or similar high thermal conductivity material to thereby conduct away from the stator coils via the stator shaft to the heat dissipating motor support structure, thermal energy generated by the $i^2R$ loss of the motor coils and magnetic core loss of stator electrical steel. The external rotor is comprised of a cylindrical housing which rotates about the stator shaft. The length of the cylindrical housing is substantially longer than the stator coils in order for the cylindrical housing to function as a direct drive roller for the belt drive system. The cylindrical housing has secured internally thereto, at one end thereof an annular permanent magnetic structure that cooperates with the rotating magnetic field in the stator to generate a drive torque in the cylindrical housing of the external rotor. The thickness of the cylindrical rotor housing is sufficient to not reduce the motor torque output. The rotational inertial of the rotor reduces transient loading to the belt being driven thereby. The stator shaft has secured thereto an array of magnetic field sensors mounted in a plane perpendicular to the stator shaft and the axis of rotation of the external rotor. A multi-pole magnetic ring is secured to an inner surface of the cylindrical rotor housing adjacent the array of magnetic field sensors such that rotational movement of the multi-pole magnetic ring past the array of sensors sequential produces an approximate sine wave voltage signal that is delivered to a controllable DC power source to cause a sine wave current to be generated and delivered to the stator coils to produce the rotating magnetic field in the stator.

It is therefore a primary object of the invention to provide a direct drive roller motor that is integrated into a belt drive roller thereby eliminating the need for a separate motor and pulley system to drive the belt drive roller.

Another principal object of the invention is to provide a DC brushless direct drive roller motor that has its efficiency enhanced by means of a thermally conductive stator support shaft that dissipates thermal energy generated by $i^2R$ loss of the motor coils and magnetic core loss of stator electrical steel by means of the heat dissipating nature of the motor support structure to which the stator is secured.

Yet another object of the invention is the cylindrical walled external rotor structure that functions as a flywheel to enhance torque delivered to a belt driven thereby when the belt experiences transient loading.

Still yet another object of the invention is the provision of a treadmill with a motor integrated into a drive roller which reduces total treadmill length and/or width, while simultaneously creating an overall treadmill silhouette that enhances ease of storage.

These and other objects, advantages and features of the invention will become more apparent from the following detailed description when taken in conjunction with the accompanying drawings.

BRIEF DESCRIPTION OF THE DRAWINGS

FIG. 2a is a view taken along line 2a—2a in FIG. 2.

DETAILED DESCRIPTION OF THE PREFERRED EMBODIMENT

Figure 1:
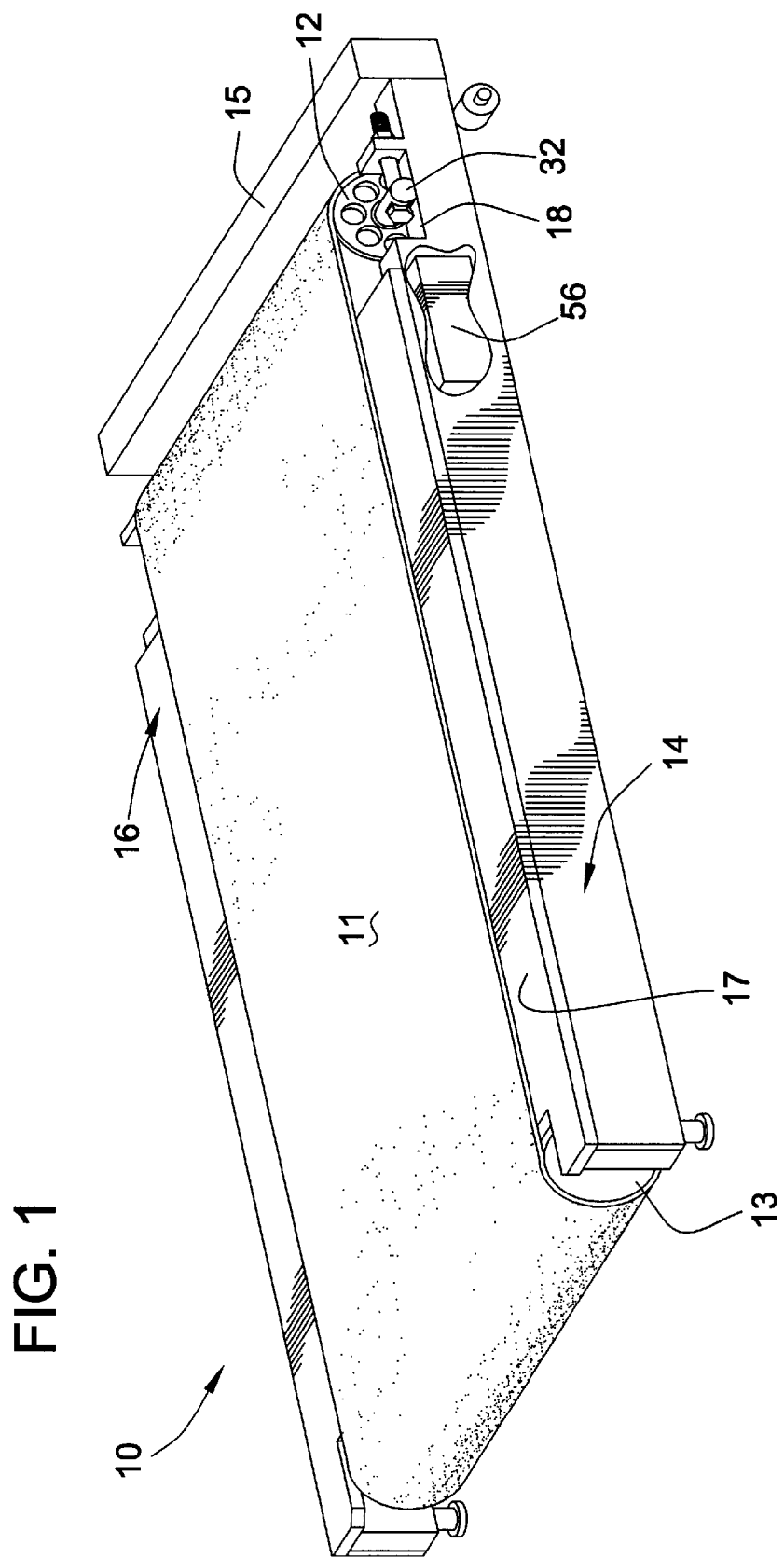
FIG. 1 is a perspective view of a treadmill that embodies the invention.

Reference is now made to FIG. 1 which illustrates in a perspective showing of a treadmill 10 absent any hand gripping structure or related control panel as these features exist in virtually all treadmills and form no part of the instant invention.

There is shown, however a treadmill walkbelt 11 which is stretched over an integrated drive roller motor 12 and an idle roller 13 position at another end of the treadmill 10. A pair of side beam support structures 14, 16 are joined together by cross member 15. The idler roller 13 is mounted for rotation in bearings (not shown) in side support structures 14, 16 in a wholly conventional fashion. A walkbelt support plate 17 spans the side beam support structures 14, 16 and is positioned beneath the walkbelt 11. It is this walkbelt support plate that carries the weight of the treadmill user. As noted earlier each time a foot of the user strikes the walkbelt 11, the walkbelt 11 tends to bind on a surface of the walkbelt support plate 17 and increases the belt drag and momentarily loads the integrated drive roller motor 12. A controlled DC power supply 56 is shown connected by an electrical lead (not shown) to the drive roller motor 12. Those skilled in the art will recognize that controlled DC power supply 56 is also referred to as DC variable speed motor controller. The role and function of the controlled DC power supply 56 will be explained more fully in conjunction with a description of the invention in the preferred embodiment of FIG. 2.

Figure 2:
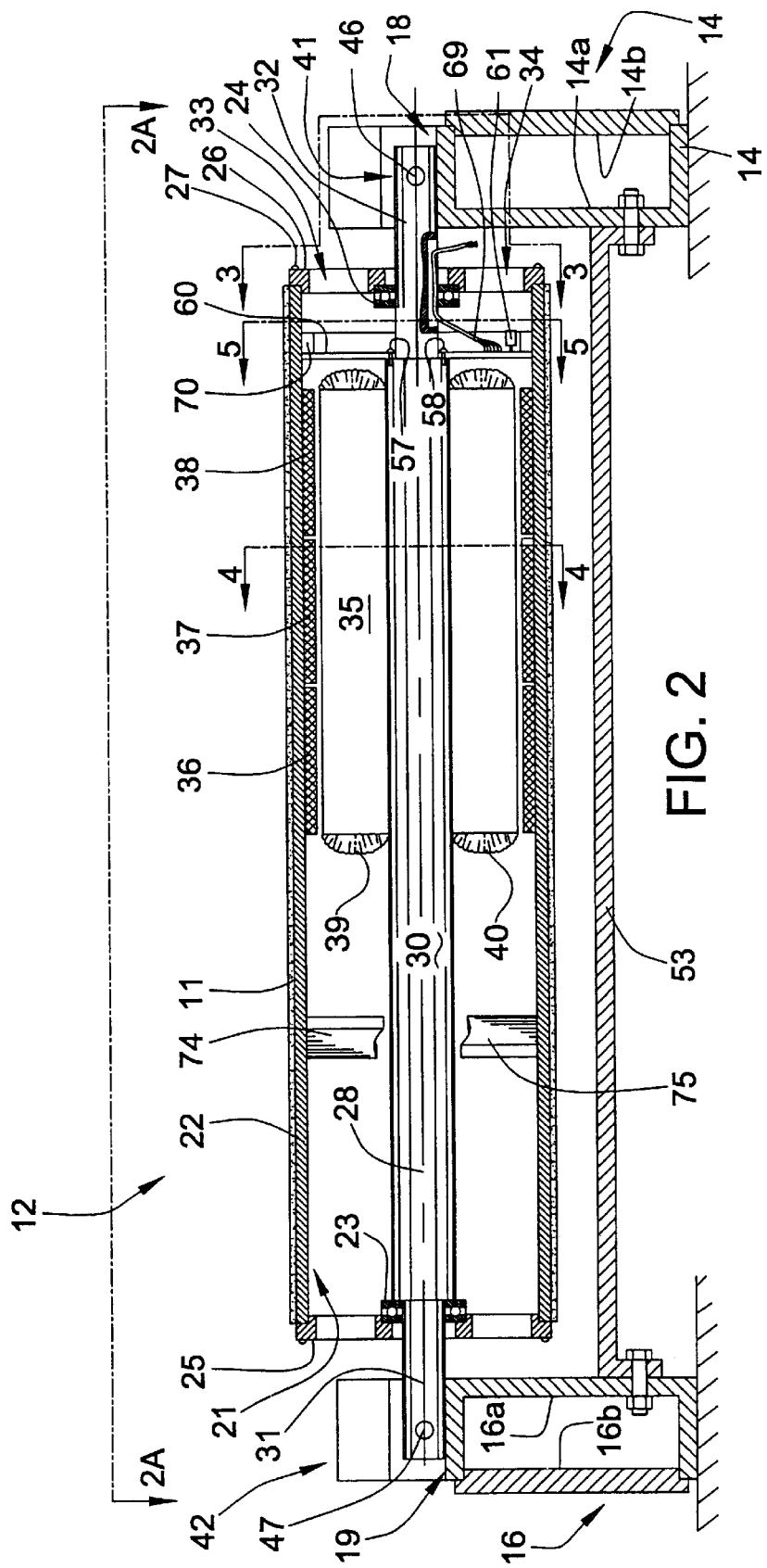
FIG. 2 is a full section of an integrated drive roller motor embodying the invention.

Attention is directed to FIG. 1 and 2 which when taken together with the explanation that follows should provide an overall appreciation of the nature of the invention. Focusing on FIG. 2 which represents a cross-section of a preferred embodiment of the direct drive roller motor 12 that contains the invention. Centrally disposed in FIG. 2 a stator shaft 30 is depicted as having a pair of stator shaft end support portions 31, 32 which are shown disposed on side beam support surfaces 18, 19 of side beam support structures 14, 16. Side beam support structures 14, 16 are comprised of channel beams 14a, 16a and channel cover plates 14b, 16b. In the preferred embodiment of the invention the stator shaft 30 is made of aluminum because of the nature of its high thermal conductivity K. It is to be understood that any other material may be employed in the construction of the stator shaft 30 as long as it posses similar strength and comparable thermal conductivities. A stator 35 is shown mounted on stator shaft 30. Stator coils/windings 39, 40 are shown schematically in this figure.

The stator shaft and support portions 31, 32 are in a thermally conductive relationship with the support surfaces 18, 19 of the side beam support structures 14, 16. An external rotor is comprised of a cylindrical housing 22 which surrounds the stator 35 and is mounted for rotation as is shown on bearings 23, 24 via rotor end bells 25, 26. The rotor end bells 25, 26 each have a plurality of ventilation ports, such as ports 33, 34. The rotor end bell ports cooperate with fan blades 74, 75 secured to cylindrical housing 22. The fan blades 74, 75 when rotated create a continuous flow of air through the openings in rotor end bells 25,26. The end bells 25, 26 are secured to the cylindrical housing 22 by means of bolts, such as bolt 27. The cylindrical rotor housing 22 functions as a drive roller of treadmill belt 11. The cylindrical rotor housing 22 has internally secured thereto for rotation therewith a plurality of annular permanent magnets three of which 36, 37, 38 are referenced. The annular permanent magnets secured to the cylindrical rotor housing 22 cooperate with a rotating magnetic field in the stator 35 to generate a drive torque in the external rotor/cylindrical housing 21 to thereby propel the belt 11 carried thereby.

It is to be understood that the motor generates $i^2R$ losses and magnetic core losses of the stator in the form of thermal energy that is conducted via the stator shaft 30 into the side beam motor support structures 14, 16 are to be dissipated therefrom which thereby enhances motor operating efficiency.

The external rotor/cylindrical housing 22 is typically longer than the stator 35. and the external rotor/housing 22 can be upwards of 25 to 30 inches in length depending upon the treadmill belt width desired.

In the preferred embodiment the stator 35 and associated motor structures are located at one end of the external rotor/housing 22 as shown in FIG. 2.

Figure 3:
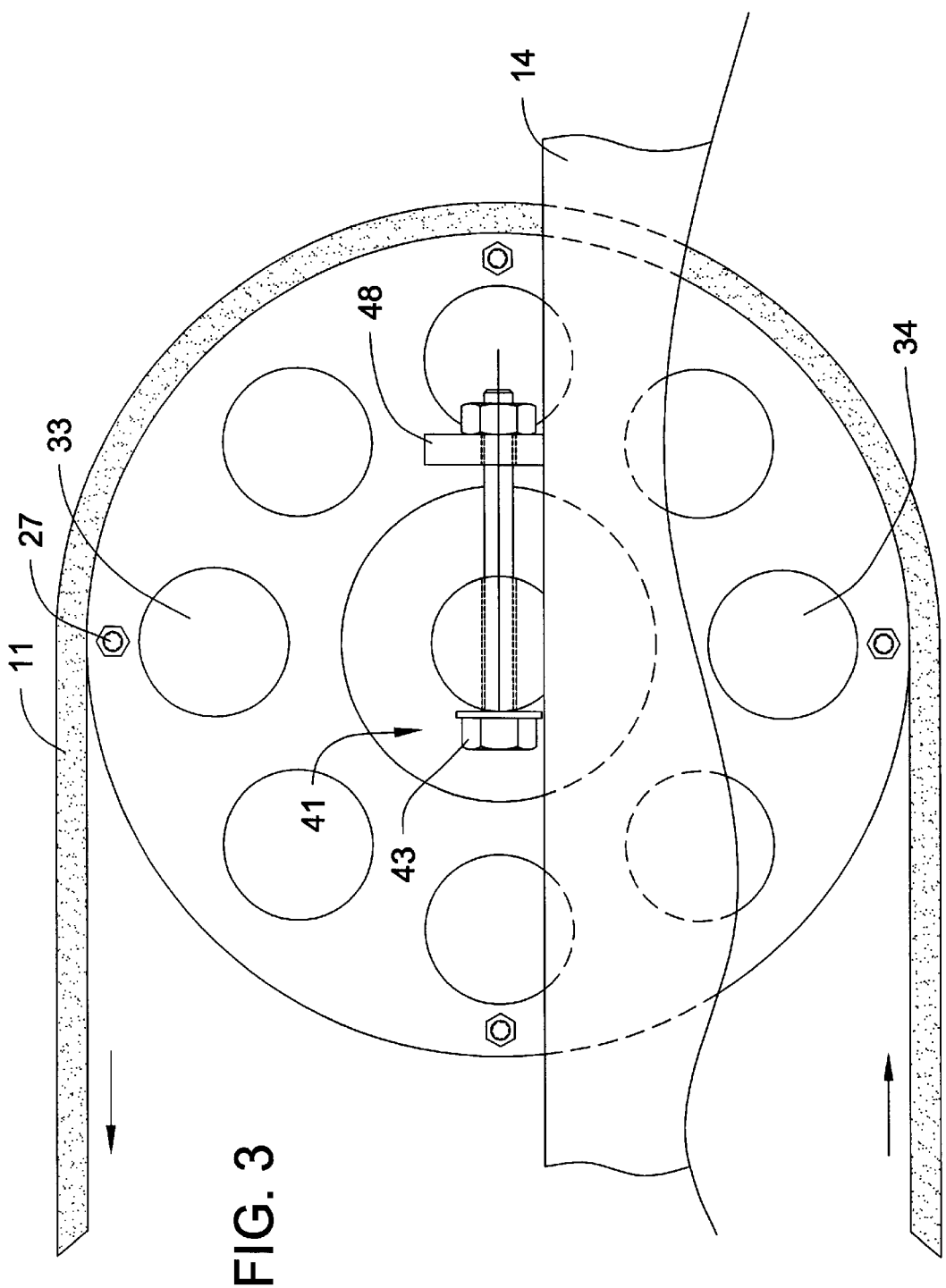
FIG. 3 is a view taken along line 3—3 in FIG 2.

At both the right and left hand end of the stator support shaft 30 as shown in FIG. 2, especially FIG. 2a and FIG. 3 there will be observed an adjustable stator shaft mounting assembly 41, 42 which is comprised of bolts 43, 44 which pass through openings 46, 47 in stator end support portions 31, 32. The bolts 43, 44 pass through upstanding brackets 48, 49 that are each integrally a part of the side beam support structures 14, 16. Nuts 51, 52 cooperate with the threads in bolts 43, 44 to allow the stator shaft 30 to be adjusted in the direction shown by arrows 54, 55.

In order to further enhance the heat dissipating capacity of the side beam support structures 14, 16 an ancillary thermal energy dissipating plate 53 connected as shown to the channel beams 14a, 16a of the side beam support structure 14, 16 is best seen in FIG. 2.

As noted earlier a rotating magnetic field in the stator 35 cooperates with the permanent magnetic structure e.g., permanent magnets 36, 37, 38 secured to the external rotor/cylindrical housing 21 to provide the torque to propel the same.

Figure 5:
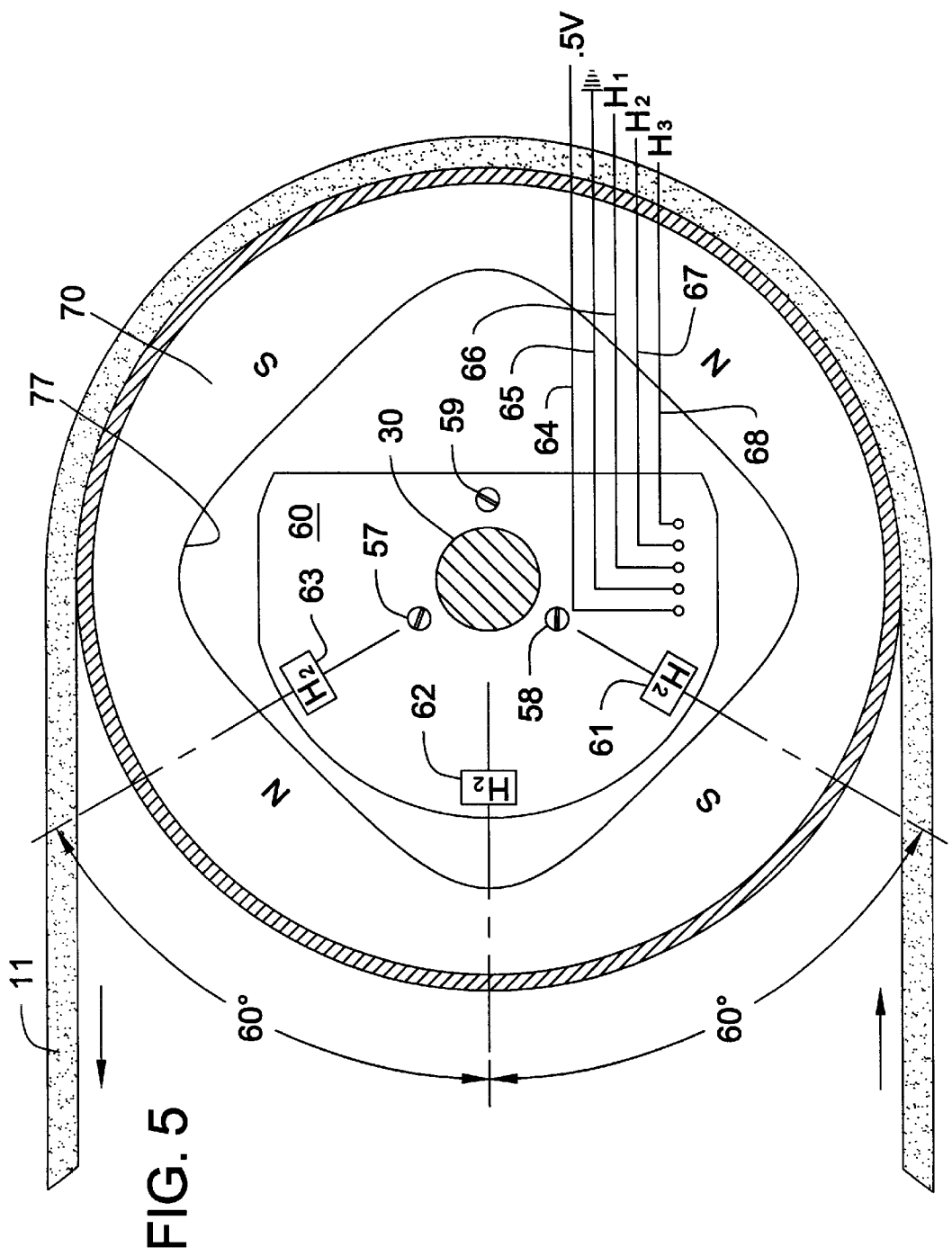
FIG. 5 is a view taken along line 5—5 in FIG. 2
Figure 6:
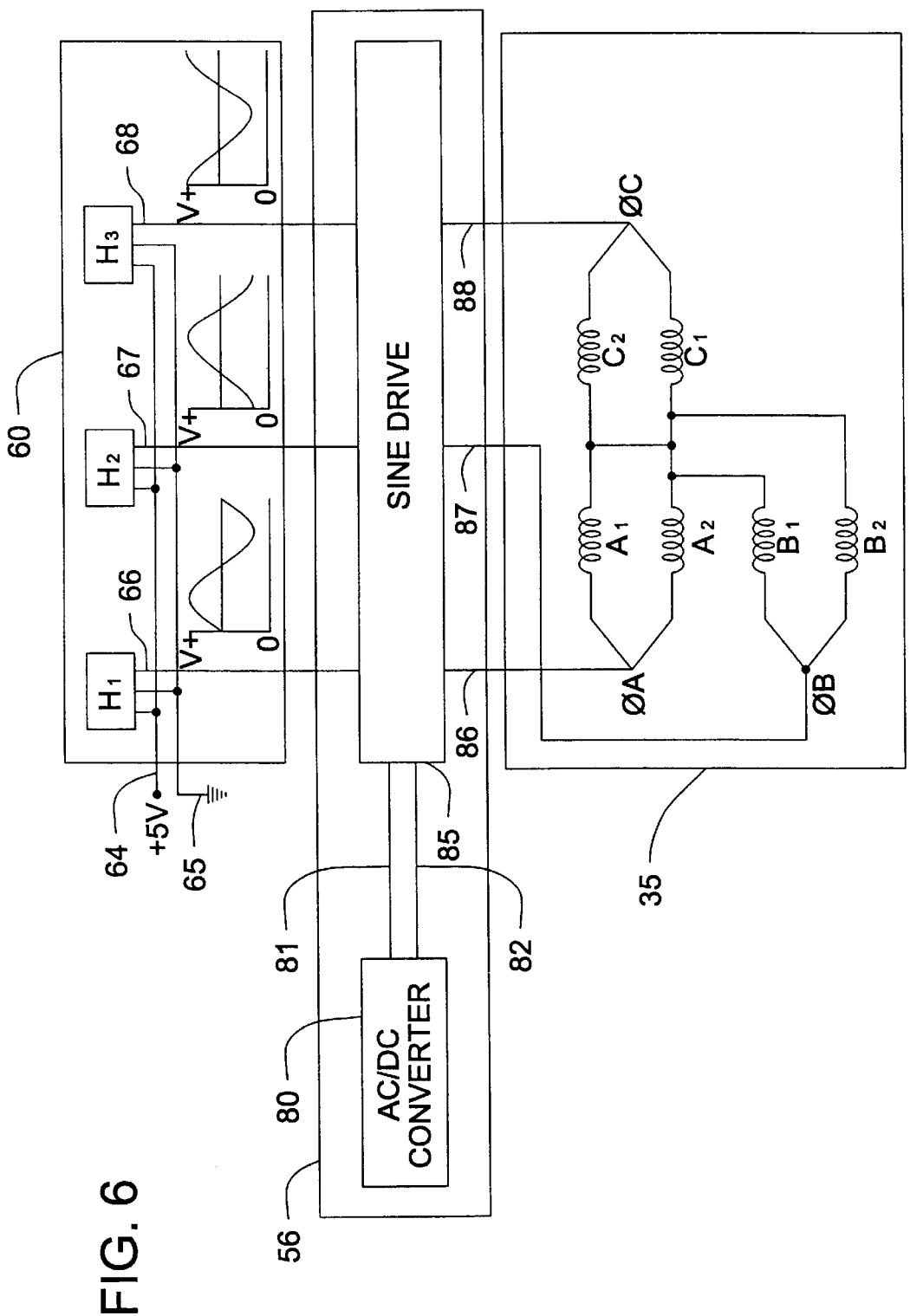
FIG. 6 is a block diagram of a motor control circuit for use in conjunction with the DC motor structure of FIGS. 1 to 5.

The creation of the rotating magnetic field will now be explained in conjunction with descriptions of FIG. 2, 4, 5 and 6. Attention is first directed to FIGS. 2 and 5. In these figures there is shown secured to stator shaft 30 by fasteners 57, 58, 59 near bearing 24, a rotor position sensor circuit board 60 which carries an array of Hall effect rotor position sensors $H_1$, $H_2$, $H_3$, which respond to the presence of a magnetic field in a known fashion to produce an analog output voltage signal directly proportional to the magnetic field strength they experience. These sensors 61, 62, 63 are mounted on the circuit board 60 in a conventional manner. A 5 volt power supply for the sensors is shown schematically by electrical leads 64, 65. Electrical leads 66, 67, 68 are connected to the sensors $H_1$, $H_2$, $H_3$ as indicated in FIGS. 5 and 6. In FIG. 5 these electrical leads are shown as a bundle of leads 69. The rotor position sensor circuit board is mounted as shown in a plane perpendicular to the stator shaft 30 and axis 28 of rotation of the external rotor 21.

A four pole magnetic ring 70 is bonded by any suitable manner to the cylindrical housing 22 in the manner shown by FIGS. 2 and 5. The physical distance between the sensors 61, 62, 63 and the poles of the magnetic ring 70 as the magnetic ring 70 rotates about the rotor position circuit board 60 determines the amplitude of the analog signal present on each of the leads 66, 67, 68. The physical configuration of the internal surface 77 of ring 70 is designed to produce a sine wave output signal as is indicated in FIG. 6.

Figure 4:
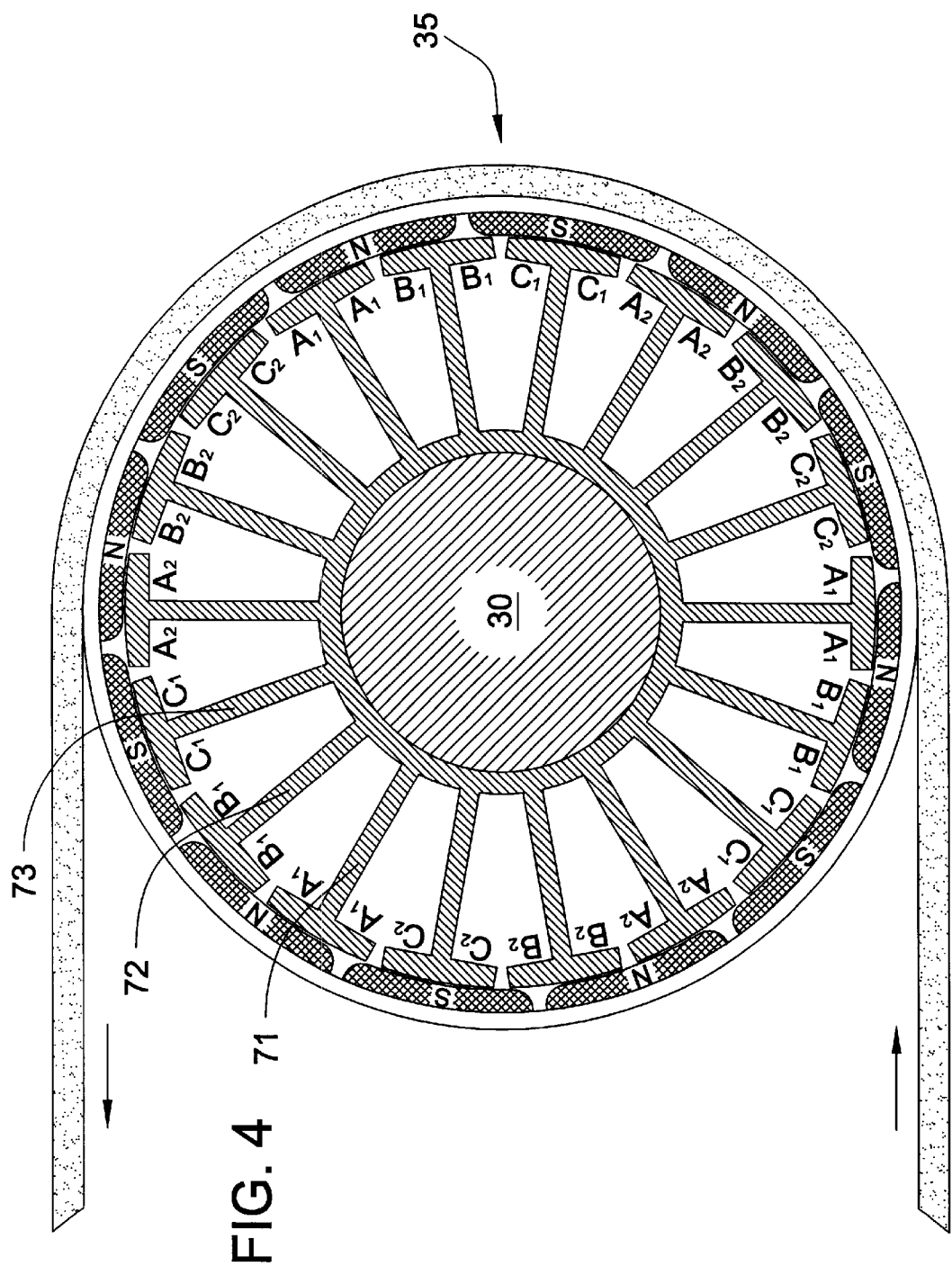
FIG. 4 is a view taken along line 4—4 in FIG. 2.

Attention is now directed to FIGS. 2, 4 and 6 with particular attention to stator 35. The stator 35 is comprised of an insulated laminated stack of electrical steel fabricated in a conventional fashion. The nature of the stator pole structure and the manner in which each pole is wound is evident in FIG. 4 and the interconnection of the stator tooth windings is shown schematically in FIG. 6. In FIG. 4, for example, laminate stator tooth 71 has indicated schematically a winding A, wound thereon and in a similar fashion stator teeth 72, 73 have windings $B_1$, $C_1$ and so forth around the stator 35 as is visually indicated. In one embodiment, the manner in which windings $A_1$, $A_2$, $B_1$, $B_2$, and $C_1$, $C_2$ are interconnected as shown in the circuit schematic of stator 35 in FIG. 6.

In FIG. 6 there is shown a block diagram of the motor control circuit to be employed in conjunction with the DC motor structure of FIGS. 1 to 5. The controlled DC power supply 56 includes an AC/DC converter 80 of conventional design electrically coupled via leads 81, 82 to sine drive 85 that receives rotor position signals from $H_1$, $H_2$, $H_3$ via leads 66, 67, and 68 and provides sine wave current via leads 86, 87 and 88 to Ø A, Ø B and Ø C as is shown schematically.

What is claimed is:

1. A direct drive external rotor DC motor for use in driving a belt carried by an external rotor, the motor comprising:

a high thermal conductivity nonrotatable stator support shaft having a stator mounted thereon, the stator support shaft secured at either end thereof in a thermally conductive manner to a heat dissipating motor support structure;

the external rotor including a cylindrical rotor housing surrounding the stator and mounted for rotation on the stator shaft, the cylindrical rotor housing acting as a drive roller to propel the belt carried by the external rotor cylindrical rotor housing; and the cylindrical rotor housing having internally secured thereto for rotation therewith an annular permanent magnetic structure that cooperates with a rotating magnetic field in the stator to generate a drive torque in the external rotor/permanent magnetic structure to thereby propel the belt;

wherein thermal energy defined by the $i^2R$ losses in stator coils and the magnetic core loss of the stator is thermally conducted via the stator support shaft into the motor support structure to be dissipated therefrom thereby enhancing the DC motor operating efficiency.

2. The direct drive external rotor DC motor of claim 1 wherein the high thermal conductivity stator shaft is made of aluminum alloy.

3. The direct drive external rotor DC motor of claim 1 wherein the external rotor cylindrical housing is substantially longer than the stator mounted on the stator support shaft and the belt propelled by the motor carried by the rotor is wide enough to span the cylindrical housing.

4. The direct drive external rotor DC motor of claim 3 wherein the stator is positioned on the stator support shaft at one end thereof.

5. The direct drive external rotor DC motor of claim 4 further including an ancillary thermal energy liberating component secured to the heat dissipating motor support structure at both ends of the stator support shaft to further enhance dissipation and motor efficiency.

6. The direct drive external rotor DC motor of claim 5 wherein the stator support shaft is adjustably mounted on the heat dissipating motor support structure to thereby facilitate changing the tension on the belt carried by the external rotor while simultaneously maintaining a thermally conductive relationship between the stator support shaft and the heat dissipating motor support structure.

7. The direct drive external rotor DC motor of claim 6 wherein the heat dissipating motor support structure additionally supports another roller around which the belt passes to provide a continuous belt path around the external rotor motor roller and the other roller.

8. The direct drive external rotor DC motor of claim 7 wherein there is included a belt support structure between the motor support structure at either end of the stator support shaft to thereby allow the belt to function as a treadmill belt to accommodate human foot falls upon the belt supported by the belt support structure.

9. The direct drive external rotor DC motor of claim 1 wherein the cylindrical rotor housing is connected by end bells at both ends of the housing to bearings mounted on the stator, the end bells each having a plurality of ventilation ports therethrough.

10. The direct drive external rotor DC motor of claim 9 wherein the cylindrical rotor housing has secured internally thereof a fan structure such that rotation of the cylindrical rotor housing causes air within the rotor housing to move through the rotor end bell ventilation ports to thereby aid in cooling the stator.

11. A low speed, high torque, direct drive external roller rotor DC motor for use in driving a belt carried by the external rotor, the DC motor including in combination:

an external roller rotor including an elongated cylindrical housing having a length that is at least as long as the width of the belt to be driven;

the cylindrical external roller rotor housing having integrally secured internal thereto at one end thereof an annular magnetic structure that cooperates with a rotating magnetic field in a stator to produce a torque in the rotor, the stator being mounted on a high thermally conductivity stator shaft that extends through and beyond ends of the cylindrical rotor housing, the stator shaft being thermally and physically coupled to a heat dissipating support structure for thermally conducting thermal energy from the stator to the dissipating support structure; and the cylindrical external roller housing being mounted for rotation on bearings adjacent ends of the roller housing, the bearings being carried by the thermally conductive stator shaft.

\* \* \* \* \*